(12) United States Patent
Oh et al.

(10) Patent No.: US 6,865,400 B2
(45) Date of Patent: Mar. 8, 2005

(54) USER INTERFACING DEVICE FOR PDA/WIRELESS TERMINAL

(75) Inventors: Kyung-Ho Oh, Kumi-shi (KR); Jeon-Man Park, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 450 days.

(21) Appl. No.: 10/154,575

(22) Filed: May 24, 2002

(65) Prior Publication Data

US 2003/0064750 A1 Apr. 3, 2003

(30) Foreign Application Priority Data

Sep. 29, 2001 (KR) ........................................ 2001-61000

(51) Int. Cl.[7] ................................................ H04Q 7/20
(52) U.S. Cl. ................................ 455/556.2; 455/556.1; 455/575.3
(58) Field of Search ........................... 455/556.1, 556.2, 455/557, 558, 575.1, 575.3, 575.4, 90.3, 566; 379/433.13, 433.07, 433.04; 345/169

(56) References Cited

U.S. PATENT DOCUMENTS

| | | | |
|---|---|---|---|
| 6,297,945 B1 * | 10/2001 | Yamamoto | 361/681 |
| 6,349,225 B1 * | 2/2002 | Lands et al. | 455/575.3 |
| 6,434,404 B1 * | 8/2002 | Claxton et al. | 455/575.3 |
| 6,642,977 B2 * | 11/2003 | Kotchick et al. | 349/96 |
| D496,655 S * | 9/2004 | Harries et al. | D14/247 |

* cited by examiner

*Primary Examiner*—Jean Gelin
(74) *Attorney, Agent, or Firm*—Dilworth & Barrese LLP

(57) ABSTRACT

An interfacing device for PDA/wireless terminal is disclosed. The interfacing device of the wireless terminal includes: a main housing provided with a main liquid crystal display (LCD) and a plurality of keys; a speaker housing which opens/closes at the main housing; a hinge means for connecting the main housing with the speaker housing; and a key top housing, which is connected to the hinge means, includes a designated shape window and an array of a plurality of keys, and opens and closes inbetween the main housing and the speaking housing, in which an auxiliary LCD is mounted at a designated position of the speaker housing to help a user to interface the auxiliary LCD through the window when the keypad housing is opened. The device has increased the convenience of use a great deal.

7 Claims, 5 Drawing Sheets

USER INTERFACING DEVICE FOR PDA/ WIRELESS TERMINAL

PRIORITY

This application claims priority to an application entitled "User interfacing device for PDA/wireless terminal" filed in the Korean Industrial Property Office on Sep. 29, 2001 and assigned Serial No. 01-61000, the contents of which are hereby incorporated by reference.

BACKGROUND OF THE INVENTION

1. Field of the Invention

The present invention relates generally to a portable wireless terminal including a cellular phone, personal digital assistance (PDA), and hand held phone (HHP). In particular, the present invention relates to a user interfacing device for a portable wireless terminal, which enables a user to select one mode out of PDA mode and cellular phone mode.

2. Description of the Related Art

In general, a cellular phone means a mobile station which is capable of providing a user and another party with wireless communication service while performing wireless communication with a base station. Sometimes, the cellular phone is classified into a bar-type, a flip-type, or a folder-type phone according to its outward appearance. Also, depending on where a user puts on, the cellular phone could be classified into a wrist-type or a neck wearable-type phone. Further, the cellular phone could be classified according to usage or function, for example, a voice communication use phone, a visual communication use phone, a game use phone or an Internet communication use phone. In the future, however, a greater variety of phones equipped with enhanced wearing convenience and convenience of use will be widely available. In particular, a combined multi-functional wireless terminal equipped with diverse modes is expected to be popular.

Among other terminals listed above, a cellular phone currently being universalized includes a data input/output unit typically used for text messaging, a transmitting/receiving unit, and an antenna. As for the data input unit, a keypad having a plurality of keys is usually used, and as for the data output unit, a liquid crystal display (LCD) is used. Also, a microphone is used as the transmitting unit, and a speaker is used as the receiving unit. In the alternative, a touch screen or a voice recognition device can be used as the data input unit. If it is necessary to input more complex data, the user needed to purchase a personal digital assistant (PDA).

However, there are several problems associated with the wireless terminal currently being universalized. Although more people prefer lighter and smaller cellular phones, the small main body of the phone cannot be accomplished unless the keypad including the LCD and the plurality of keys is also miniaturized. However, if the LCD is miniaturized, the user will find it difficult to check the data thereon. Also, if the keypad is miniaturized, it will be hard to input data by pressing the keys using a finger. This is why some industries are hesitant to miniature the wireless terminal because they know it would be very difficult to make the cellular phone yet enlarge the LCD and the keypad at the same time.

Nevertheless, it is inevitable that a multi-functional wireless terminal will be developed to keep abreast of a greater variety of Internet environment, requiring more keys and a larger LCD to perform diverse functions. In other words, the wireless terminal currently being used is not sufficient to satisfy the user's different needs in addition to making phone calls, such as, sending emails or chatting through the PDA and receiving other additional services. Therefore, more keys and a large LCD are definitely necessary to keep up with growing needs of the users. That is to say, a data input/output device providing more convenience to the data input/output operation is desirable for the wireless terminal.

SUMMARY OF THE INVENTION

It is, therefore, an object of the present invention to provide a user interfacing device for PDA/wireless terminal that can be used for a cellular phone and a PDA.

It is another object of the present invention to provide a user interfacing device for PDA/wireless terminal, which displays data through an auxiliary LCD to a speaker housing when the user interfacing device is used as the PDA only.

It is still another object of the present invention to provide a user interfacing device for PDA/wireless terminal, which is capable of operating a specific application displayed on an auxiliary LCD by one clicking.

To achieve the above objects, there is provided a PDA/wireless terminal, which includes a main housing with a main LCD and a plurality of keys. A speaker housing opens and closes at the main housing. A hinge means connects the main housing with the speaker housing. A key top housing is connected to the hinge means, and includes a designated shape window and a plurality of keys in an array, and opens and closes inbetween the main housing and the speaking housing. An auxiliary LCD is mounted at a designated position of the speaker housing to allow a user to interface the auxiliary LCD through the window when the keypad housing is opened.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

Figure 1:
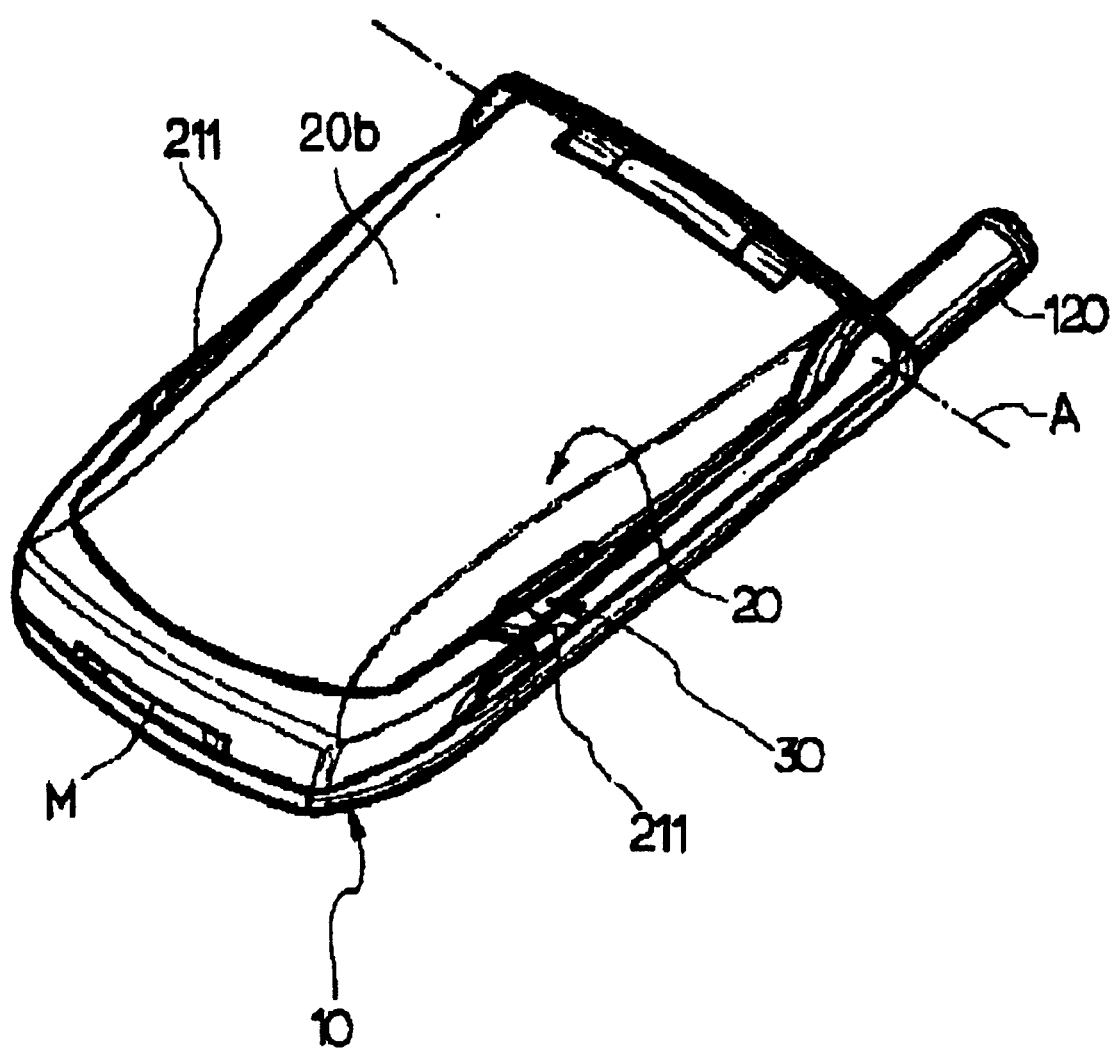
FIG. 1 is a prospective view showing a closed speaker housing of a PDA/wireless terminal in accordance with a preferred embodiment of the present invention.
Figure 2:
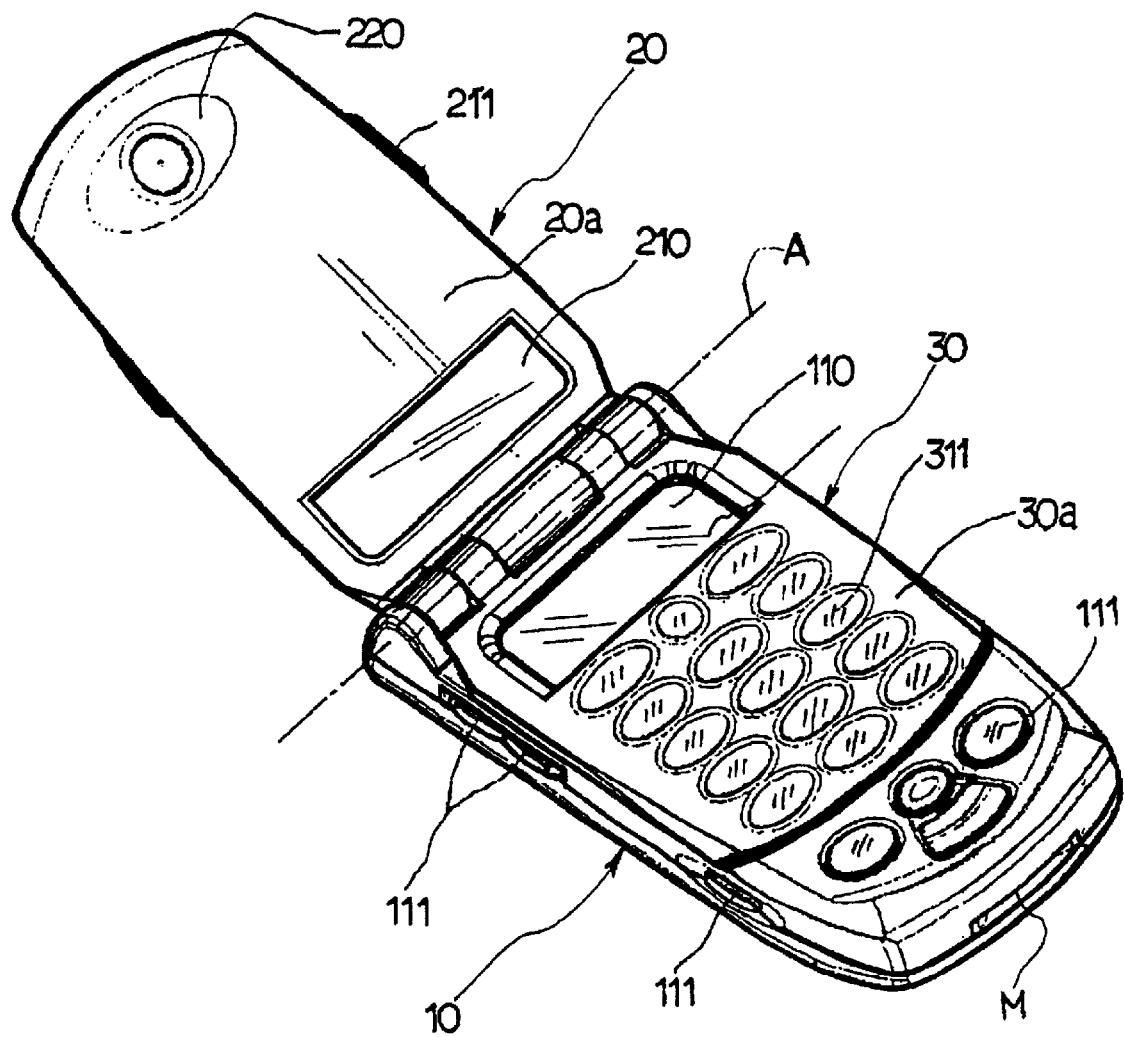
FIG. 2 is a prospective view showing a completely opened speaker housing of a PDA/wireless terminal in accordance with the preferred embodiment of the present invention, especially when the PDA/wireless terminal is used as a cellular phone.
Figure 4:
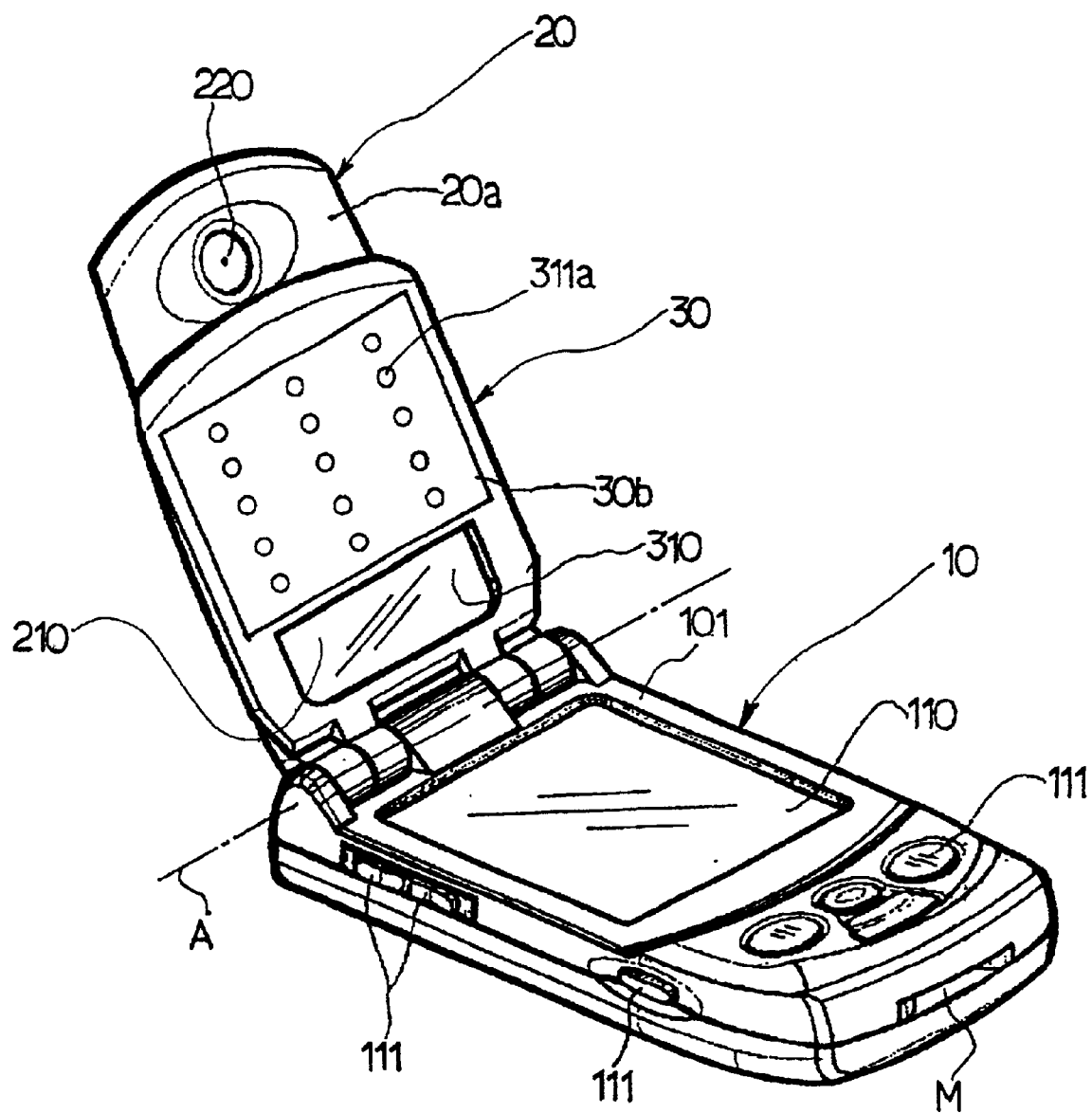
FIG. 4 is a prospective view showing a completely opened keypad housing of a PDA/wireless terminal in accordance with the preferred embodiment of the present invention, when the PDA/wireless terminal is primarily used as a PDA.

The wireless terminal mounted with a user interfacing device according to the present invention can be used as a cellular phone and a personal digital assistance (PDA) as well. FIG. 1 shows a portable wireless terminal. FIG. 2 diagrammatically shows a wireless terminal in a cellular phone mode. FIG. 4 diagrammatically shows a wireless terminal in a PDA mode. That is to say, a user should be aware that the wireless terminal of the present invention can be used for either the cellular phone mode or the PDA mode, depending on whether a keypad housing 30 is opened or closed.

The configuration of the wireless terminal according to the present invention will now be explained with reference to FIGS. 1 through 4. In general, the wireless terminal in accordance with one embodiment of the present invention includes three rotary housings 10, 20, and 30 which are connected to one hinge means H and may be rotated with respect to one another at hinge means H, and two liquid crystal displays (LCD) provided to two selected housings out of the three housings. More specifically, the three housings includes a main housing 10 that supports the base of the one hinge means H, a speaker housing 20, and a key top housing 30 disposed inbetween the main housing 10 and the speaker housing 20. The key top housing 30 and the speaker housing 20 are connected with main housing 10 at hinge means H.

The two LCDs include a main LCD 110 provided to the main housing 10, and an auxiliary LCD 210 provided to the speaker housing 20. The main LCD 110 is a wide LCD disposed on a top surface of the main housing 10, best seen in FIGS. 3 and 4, while the auxiliary LCD 210 is disposed at a designated position on a bottom surface 20a of the speaker housing 20. The designated position for the auxiliary LCD 210 to be installed proximal to a hinge axis A of hinge means H.

The main housing 10, the speaker housing 20, and the key top housing 30 open and close up to a call angle around the hinge axis A, as shown in FIGS. 2 and 4. The call angle means an amount of rotation angle of the speaker housing 20 or the bidirectional key top housing 30 around the main housing 10. The call angle of the speaker housing 20 or the key top housing 30 is in range of from approximately 135 deg. to 160 deg.

The terminal depicted in FIG. 1 is closed, indicating that the speaker housing 20 or the key top housing 30 is closed with respect to the main housing 10. As shown in the drawing, the terminal includes the main housing 10, the key housing 30 which is disposed on the main housing 10, and the speaker housing 20 which is disposed on the key top housing 30. The main housing 10, the speaker housing 20 and the key top housing 30 are all connected about axis A via hinge means H. The speaker housing 20 of the terminal opens at the same time when it is desirable for the key top housing 30 to open. The reference numeral 211 indicates a notch which is projected to an opposite direction from the speaker housing in order to make it easier to open/close the speaker housing.

Figure 3:
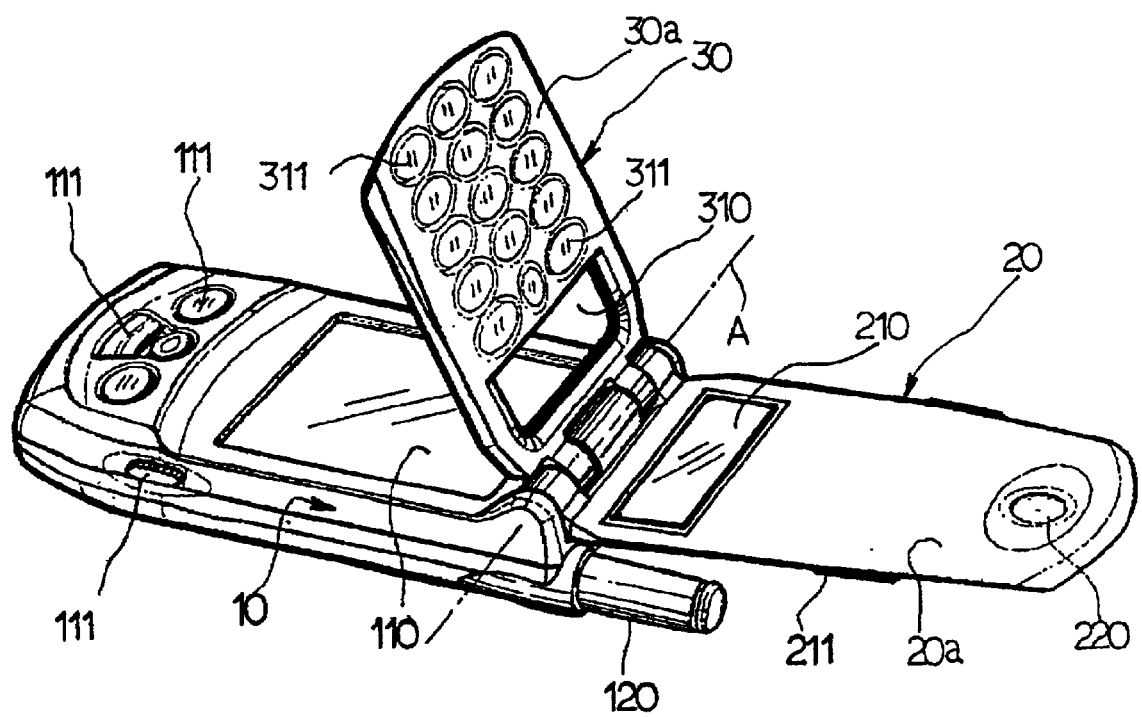
FIG. 3 is a prospective view showing a state in which a keypad housing of a PDA/wireless terminal in accordance with the preferred embodiment of the present invention is being opened.

Now referring to FIGS. 2 through 4, the speaker housing 20 includes a top surface 20b and a bottom surface 20a, and a speaker 220 and an auxiliary LCD 210 are mounted at designated positions on the bottom surface 20a. Preferably, the auxiliary LCD 210 is mounted on speaker housing near axis A. In short, the speaker 220 is placed far from the hinge axis A, while the auxiliary LCD 210 is placed near to the hinge axis A.

Similar to the speaker, the key top housing 30 includes two sides, that is, a top surface 30a and a bottom surface 30b, and a keypad having a plurality of keys 311 arrayed and a window 310 are mounted at the top surface 30a. In general, FIG. 2 shows that the keypad on the top surface 30a consists of arranged keys 311 mainly for use of voice communication, or a cellular phone, including a send key and a power key. On the other hand, FIG. 4 shows that there are contact use projectors 311a arrayed on the bottom surface 30b of the key top housing 30, so when the user presses a selected key 311, the projectors are in touch with the wide LCD 110. When operating as a cellular phone, depressing one of the keys 311 causes the respective projector 311a to contact the respective portion of the touch sensitive LCD 110.

In addition, the window 310 may be an opening or a transparent window. In case the wireless terminal is used as a cellular phone, the window 310 enables the user to check the data displayed on the wide LCD 110 that is mounted at the main housing 10, without actually opening the key top housing 30. On the other hand, if the wireless terminal is used as the PDA, the window 30 enables the user to check the data displayed on the auxiliary LCD 210, without opening the keypad housing.

Also, call related information and icons displaying date, time, receive sensitivity of the antenna or residual amount of a battery are displayed on an upper portion of the wide LCD 110, and the user can check the displayed data through the window 310 while the terminal is being in the cellular phone mode.

Preferably, the auxiliary LCD 210 is used as a launcher. That is, a normal user, given that the user's several favorite application tools for use of launcher are pre-designated as some icons, can simply click the icons using a finger or a pen to initiate the operation. More specifically, the primary function of the auxiliary LCD 210 is to help the user to execute the application he or she wants by one single click, just like clicking a dedicated icon on the desktop of a computer, without undergoing several input procedures to execute that particular application. Moreover, the auxiliary LCD 210 can be replaced by a touch screen that can be employed as an input window for a handwriting input program.

In addition, the wide LCD 110 is mounted on the top surface 101 of the main housing 10, covering a large portion of the main housing. The wide LCD 110 also acts as a GUI with a touch screen for data input/output. In this manner, the user can input data through the wide LCD 110 and output the inputted data.

The operation of the wireless terminal according to the present invention is now explained below.

First, if the wireless terminal is in the cellular phone mode, that is, if the speaker housing 20 is opened and the keypad housing 30 is closed with respect to the main housing 10, the user inputs a wanted data by pressing a key 311 using a finger. The inputted data is displayed on the upper portion of the wide LCD 110, and the user can check the displayed data through the window 310. Additionally, by installing a sensor (not shown) to the keypad housing 30 for detecting an auto switching state, if the user clicks the auxiliary LCD 210 while the speaker housing 20 is opened, the auxiliary LCD 210 is automatically used as the launcher. Next, if the speaker housing 20 and the keypad housing 30 are opened from the main housing 10, the wireless terminal is put in the PDA mode. In such case, the user may use the wireless terminal as the PDA, and at the same time, he or she can interface the auxiliary LCD 210 through the window 310.

Figure 5:
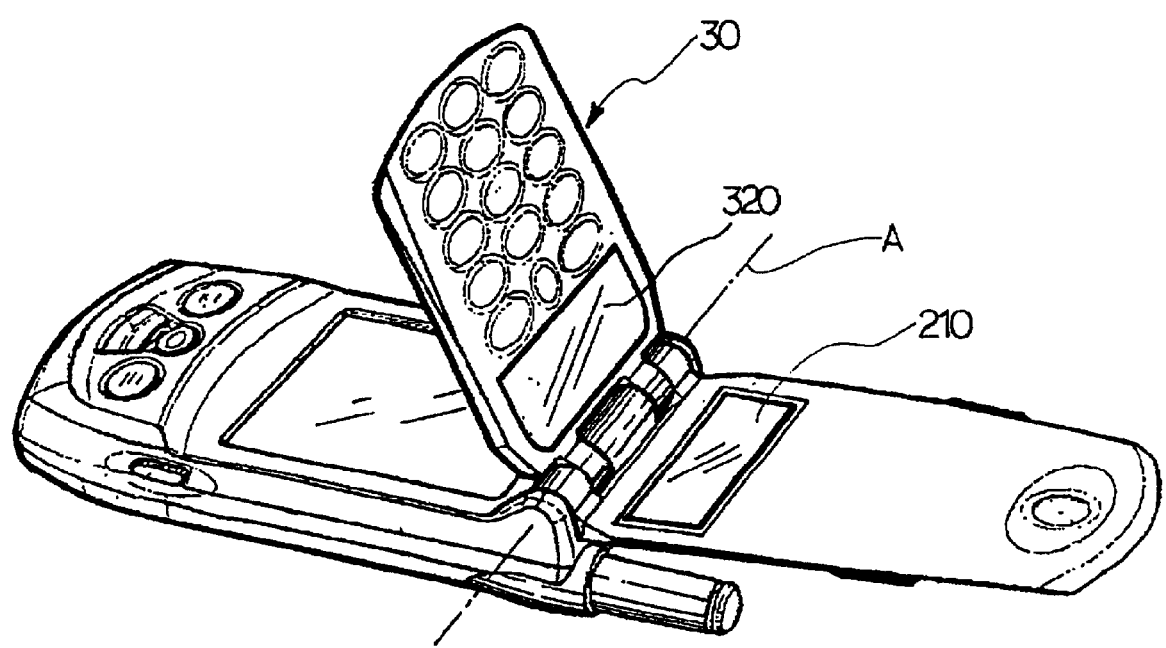
FIG. 5 is a prospective view showing a PDA/wireless terminal having a transparent window in accordance with another preferred embodiment of the present invention.

As shown in FIG. 5, the window provided to the keypad housing can be replaced by a transparent window 320.

In conclusion, by using the PDA/wireless terminal according to the present invention in which the auxiliary LCD is used as the launcher in the speaker housing, it became possible for the user to execute a specific application by a single click. Shortly speaking, the present invention greatly improved the user's convenience because all he or she has to do is to click a particular application he or she wants to execute on the auxiliary LCD, and even better, this consequently brought a wider LCD.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A device for use with a personal digital assistant (PDA)/wireless terminal, the device comprising:
    a main housing provided with a main liquid crystal display (LCD) and a plurality of keys;
    a speaker housing which opens and closes at the main housing;
    a hinge means for connecting the main housing with the speaker housing;
    a key top housing, which is also connected to the hinge means, the key top housing including a window and a plurality of keys in an array, the key top housing opening and closing between the main housing and the speaking housing; and
    an auxiliary LCD mounted at a position on the speaker housing corresponding to the window on the key top housing when the key top housing is open, thereby allowing user access to the auxiliary LCD through the window when the keypad housing is opened.

2. The device as claimed in claim 1, wherein the auxiliary LCD is disposed at a bottom region of the speaker housing proximal to the axis of the hinge.

3. The device as claimed in claim 1, wherein the window is disposed at a top region of the keypad housing proximal to the hinge axis.

4. The device as claimed in claim 1, wherein the window is an opening.

5. The device as claimed in claim 1, wherein the window is a transparent window.

6. The device as claimed in claim 1, wherein the auxiliary LCD displays a specific application, and a displayed data thereon is operated by one click.

7. The device as claimed in claim 1, wherein the auxiliary LCD is a touch screen.

* * * * *